United States Patent
Gullo et al.

(10) Patent No.: US 8,600,909 B2
(45) Date of Patent: Dec. 3, 2013

(54) PC POSTAGE™ SERVICE INDICIA DESIGN FOR SHIPPING LABEL

(75) Inventors: John F. Gullo, Alexandria, VA (US); Wayne A. Wilkerson, Manassas, VA (US); Roy R. Gordon, Gaithersburg, MD (US); Dan Lord, Upper Marlboro, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 13/334,931

(22) Filed: Dec. 22, 2011

(65) Prior Publication Data

US 2012/0095880 A1 Apr. 19, 2012

Related U.S. Application Data

(62) Division of application No. 10/628,411, filed on Jul. 29, 2003, now Pat. No. 8,108,322.

(60) Provisional application No. 60/399,251, filed on Jul. 29, 2002.

(51) Int. Cl.
*G06Q 30/00* (2012.01)
*G06F 17/00* (2006.01)
*G07B 17/02* (2006.01)

(52) U.S. Cl.
USPC .................................. 705/335; 705/401

(58) Field of Classification Search
USPC .............................. 705/335, 401
See application file for complete search history.

(56) References Cited

U.S. PATENT DOCUMENTS

| | | | |
|---|---|---|---|
| 3,978,457 A | 8/1976 | Check, Jr. et al. | |
| 4,093,999 A | 6/1978 | Fuller et al. | |
| 4,097,923 A | 6/1978 | Eckert, Jr. et al. | |
| 4,271,481 A | 6/1981 | Check, Jr. et al. | |
| 4,376,299 A | 3/1983 | Rivest | |
| 4,637,051 A | 1/1987 | Clark | |
| 4,641,346 A | 2/1987 | Clark et al. | |
| 4,641,347 A | 2/1987 | Clark et al. | |
| 4,660,221 A | 4/1987 | Dlugos | |
| 4,675,841 A | 6/1987 | Check, Jr. et al. | |
| 4,725,718 A | 2/1988 | Sansone et al. | |
| 4,743,747 A | 5/1988 | Fougere et al. | |

(Continued)

FOREIGN PATENT DOCUMENTS

| | | |
|---|---|---|
| CN | 1222707 A | 7/1999 |
| EP | 0 589 723 | 3/1994 |

(Continued)

OTHER PUBLICATIONS

Office Action, mailed Jun. 10, 2010, by the U.S. Patent and Trademark Office for U.S. Appl. No. 10/630,589 (15 pages).

(Continued)

*Primary Examiner* — Allen J Jung
(74) *Attorney, Agent, or Firm* — Finnegan, Henderson, Farabow, Garrett & Dunner LLP

(57) ABSTRACT

Systems and methods of insuring payment of a proper amount of postage, comprise receiving payment for an amount of postage, affixing a postage indicia to a piece of mail, wherein the postage indicia includes the postage amount in a format readable only by machine, and adjusting the postage amount at a time subsequent to receipt of payment.

10 Claims, 7 Drawing Sheets

(56) References Cited

U.S. PATENT DOCUMENTS

| | | | |
|---|---|---|---|
| 4,757,537 A | 7/1988 | Edelmann et al. | |
| 4,760,534 A | 7/1988 | Fougere et al. | |
| 4,775,246 A | 10/1988 | Edelmann et al. | |
| 4,809,185 A | 2/1989 | Talmadge | |
| 4,811,234 A | 3/1989 | Storace | |
| 4,812,965 A | 3/1989 | Taylor | |
| 4,812,992 A | 3/1989 | Storace et al. | |
| 4,831,555 A | 5/1989 | Sansone et al. | |
| 4,835,713 A | 5/1989 | Pastor | |
| 4,837,701 A | 6/1989 | Sansone et al. | |
| 4,853,864 A | 8/1989 | Hart et al. | |
| 4,853,865 A | 8/1989 | Sansone et al. | |
| 4,858,138 A | 8/1989 | Talmadge | |
| 4,864,506 A | 9/1989 | Storace | |
| 4,873,645 A | 10/1989 | Hunter et al. | |
| 4,907,161 A | 3/1990 | Sansone et al. | |
| 4,934,846 A | 6/1990 | Gilham | |
| 4,949,381 A | 8/1990 | Pastor | |
| 4,978,839 A | 12/1990 | Chen et al. | |
| 4,999,481 A | 3/1991 | Baer et al. | |
| 5,019,991 A * | 5/1991 | Sansone et al. | 705/407 |
| 5,022,080 A | 6/1991 | Durst et al. | |
| 5,085,470 A | 2/1992 | Peach et al. | |
| 5,181,245 A | 1/1993 | Jones | |
| 5,186,498 A | 2/1993 | Dietrich | |
| 5,189,700 A | 2/1993 | Blandford | |
| 5,200,903 A | 4/1993 | Gilham | |
| 5,202,914 A | 4/1993 | Kim et al. | |
| 5,224,046 A | 6/1993 | Kim et al. | |
| 5,233,531 A | 8/1993 | Schulz | |
| 5,257,197 A | 10/1993 | Gunther et al. | |
| 5,258,906 A | 11/1993 | Kroll et al. | |
| 5,280,531 A | 1/1994 | Hunter | |
| 5,293,319 A | 3/1994 | DeSha et al. | |
| 5,297,202 A | 3/1994 | Kapp et al. | |
| 5,308,932 A | 5/1994 | Manduley et al. | |
| 5,309,363 A | 5/1994 | Graves et al. | |
| 5,319,562 A | 6/1994 | Whitehouse | |
| 5,324,893 A | 6/1994 | Manduley et al. | |
| 5,334,823 A | 8/1994 | Noblett, Jr. et al. | |
| 5,337,361 A | 8/1994 | Wang et al. | |
| 5,375,172 A | 12/1994 | Chrosny | |
| 5,390,251 A | 2/1995 | Pastor et al. | |
| 5,422,954 A | 6/1995 | Berson | |
| 5,457,642 A | 10/1995 | Brookner | |
| 5,471,533 A | 11/1995 | Wang et al. | |
| 5,490,217 A | 2/1996 | Wang et al. | |
| 5,510,922 A | 4/1996 | Naito | |
| 5,526,271 A | 6/1996 | Abumehdi | |
| 5,535,127 A | 7/1996 | Uno et al. | |
| 5,535,279 A | 7/1996 | Seestrom | |
| 5,583,779 A | 12/1996 | Naclerio et al. | |
| 5,586,036 A | 12/1996 | Pintsov | |
| 5,602,742 A | 2/1997 | Solondz et al. | |
| 5,606,507 A | 2/1997 | Kara | |
| 5,612,889 A | 3/1997 | Pintsov et al. | |
| 5,638,283 A | 6/1997 | Herbert | |
| 5,717,596 A | 2/1998 | Bernard et al. | |
| 5,774,554 A | 6/1998 | Gilham | |
| 5,801,944 A | 9/1998 | Kara | |
| 5,865,470 A | 2/1999 | Thompson | |
| 5,869,819 A | 2/1999 | Knowles et al. | |
| 5,917,924 A | 6/1999 | Herbert | |
| 5,923,763 A | 7/1999 | Walker et al. | |
| 5,936,865 A | 8/1999 | Pintsov et al. | |
| 5,974,147 A * | 10/1999 | Cordery et al. | 705/62 |
| 5,978,781 A | 11/1999 | Sansone | |
| 6,005,945 A | 12/1999 | Whitehouse | |
| 6,006,211 A | 12/1999 | Sansone et al. | |
| 6,032,138 A | 2/2000 | McFiggins et al. | |
| 6,064,993 A | 5/2000 | Ryan, Jr. | |
| 6,064,995 A | 5/2000 | Sansone et al. | |
| 6,085,181 A | 7/2000 | Gravell et al. | |
| 6,105,014 A | 8/2000 | Ramsden et al. | |
| 6,112,193 A | 8/2000 | Dlugos et al. | |
| 6,119,228 A | 9/2000 | Angelo et al. | |
| 6,125,357 A | 9/2000 | Pintsov | |
| 6,208,980 B1 | 3/2001 | Kara | |
| 6,233,568 B1 | 5/2001 | Kara | |
| 6,285,990 B1 | 9/2001 | Lee et al. | |
| 6,311,892 B1 | 11/2001 | O'Callaghan et al. | |
| 6,321,992 B1 | 11/2001 | Knowles et al. | |
| 6,385,504 B1 | 5/2002 | Pintsov et al. | |
| 6,394,354 B1 | 5/2002 | Wilz, Sr. et al. | |
| 6,408,286 B1 | 6/2002 | Heiden | |
| 6,549,892 B1 | 4/2003 | Sansone | |
| 6,779,178 B1 | 8/2004 | Lloyd et al. | |
| 6,889,197 B2 | 5/2005 | Lidow | |
| 6,917,924 B1 | 7/2005 | Ramsden et al. | |
| 7,266,696 B2 | 9/2007 | Chamberlain | |
| 7,458,612 B1 * | 12/2008 | Bennett | 283/81 |
| 2001/0002485 A1 | 5/2001 | Bisbee et al. | |
| 2001/0020234 A1 * | 9/2001 | Shah et al. | 705/62 |
| 2001/0034716 A1 | 10/2001 | Goodwin | |
| 2001/0044783 A1 | 11/2001 | Weisberg et al. | |
| 2002/0019938 A1 | 2/2002 | Aarons | |
| 2002/0046195 A1 | 4/2002 | Martin et al. | |
| 2002/0083019 A1 | 6/2002 | Bystrak et al. | |
| 2002/0164021 A1 | 11/2002 | Sandru | |
| 2003/0101143 A1 * | 5/2003 | Montgomery et al. | 705/62 |
| 2003/0225711 A1 | 12/2003 | Paping | |
| 2004/0089482 A1 | 5/2004 | Ramsden et al. | |
| 2004/0139005 A1 | 7/2004 | Ganesan | |
| 2004/0139327 A1 | 7/2004 | Brown et al. | |
| 2004/0186811 A1 | 9/2004 | Gullo et al. | |
| 2005/0102241 A1 | 5/2005 | Cook et al. | |
| 2005/0171848 A1 | 8/2005 | Walker et al. | |
| 2009/0182687 A1 | 7/2009 | Stickler et al. | |

FOREIGN PATENT DOCUMENTS

| | | |
|---|---|---|
| EP | 0 732 673 | 9/1996 |
| WO | WO 88/01818 | 3/1988 |
| WO | WO 97/14117 A2 | 4/1997 |
| WO | WO 97/14482 | 4/1997 |
| WO | WO 01/03363 | 1/2001 |
| WO | WO 02/08988 A1 | 1/2002 |
| WO | WO 02/21388 | 3/2002 |

OTHER PUBLICATIONS

Examiner's First Report, dated Mar. 31, 2008, mailed by IP Australia of the Australian Government, in Australian Patent Application No. 2003256905, which is a counterpart to U.S. Appl. No. 10/630,589 (2 pages).

Final Office Action, mailed Sep. 24, 2008, by the U.S. Patent and Trademark Office, in U.S. Appl. No. 10/630,589 (11 pages).

First Notification of Office Action, dated Feb. 1, 2008, mailed by the State Intellectual Property Office of China, in Chinese Patent Application No. 038243016, which is a counterpart to U.S. Appl. No. 10/630,589 (24 pages with 32-page translation), Jul. 29, 2003.

Non-Final Office Action mailed Apr. 27, 2009, by the U.S. Patent and Trademark Office, in U.S. Appl. No. 10/630,589 (12 pages).

Non-Final Office Action, mailed Nov. 16, 2007, by the U.S. Patent and Trademark Office, in U.S. Appl. No. 10/630,589 (7 pages).

Final Office Action, mailed Jan. 5, 2010, by the U.S. Patent and Trademark Office, in U.S. Appl. No. 10/630,589 (16 pages).

Kahaner L., "Click-And-Mail Services Cancel Post-Office Hassles," Information Week, Jul. 24, 2000, http://informationweek.com/796/postage.htm (2 pages).

Pastore M., "Small Business Welcomes PC Postage," ClickZ, Mar. 2, 2000, http://www.clickz.com/314571 (1 page).

Zurier S., "Postal Service Reboot E-Biz," http://www.internetweek.com/newslead01/lead081301.htm (4 pages).

Office Action, mailed Dec. 27, 2010, by the U.S. Patent and Trademark Office for U.S. Appl. No. 10/450,613 (15 pages).

Office Action, mailed Nov. 1, 2010, by the U.S. Patent and Trademark Office for U.S. Appl. No. 10/630,589 (15 pages).

Final Office Action, mailed Jan. 25, 2011, by the U.S. Patent and Trademark Office for U.S. Appl. No. 12/382,462 (13 pages).

(56) References Cited

OTHER PUBLICATIONS

Office Action, mailed Oct. 6, 2010, by the U.S. Patent and Trademark Office for U.S. Appl. No. 12/382,462 (13 pages).
Gilbert—"Rating Systems Help Carriers Shine", National Underwriter (Property & Casualty/Risk & Benefits Management), Jul. 29, 1996, vol. 100, No. 31.
PR Newswire—"Stamps.com Launches New Enhanced Version of Internet Postage", Jul. 19, 2000.
"Hendrick Motorsports Teams with Osprey ™ Systems to Develop and Launch commerce-enabled Web Site" PR newswire, p. 2260. Dec. 7, 1998.
Co-Pending U.S. Appl. No. 10/450,469; Title: Electronic Postmarking without Directly Utilizing an Electronic Postmark Server; filed Jun. 13, 2003.
Co-Pending U.S. Appl. No. 10/450,613; Title: Method of Using Personal Signature As Postage; filed Jun. 17, 2003.
Co-Pending U.S. Appl. No. 10/630,589; Title: Systems and Methods for Mid-Stream Postage Adjustment; filed Jul. 29, 2003.
International Search Report in PCT/US01/47720, mailed May 14, 2002 (3 pages).
International Search Report in PCT/US01/48271, mailed Aug. 29, 2002 (3 pages).
International Search Report in PCT/US03/23490, mailed Mar. 5, 2004 (4 pages).
International Search Report in PCT/US03/23492, mailed Nov. 12, 2003 (5 pages).
Global Express Guaranteed: Frequently Asked Questions, https://sss-web.usps.com/gxg/jsps/showFAQ.jsp, website printout dated Apr. 24, 2003 (6 pages).
Global Express Guaranteed: Introducing . . . , https://sss-web.usps.com/gxg/jsps/index.jsp, website printout dated Apr. 24, 2003 (1 page).
Global Express Guaranteed: System Requirements for Label Printing, https://sss-web.usps.com/gxg/jsps/showSystemReqs.jsp, website printout dated Apr. 24, 2003 (1 page).
Information Week, Click-And-Mail Services Cancel Post-Office Hassles, Jul. 24, 2000, http://www.informationweek.com/796/prpostage.htm, website printout dated Apr. 24, 2003 (4 pages).
InternetWeek, Back to Reality: Postal Service Reboots E-Biz, Aug. 13, 2001, http://www.internetweek.com/newslead01/lead081301.htm?ls=TW_070202_fea, website printout dated Apr. 24, 2003 (4 pages).
Markets: Small Biz, Small Business Welcomes PC Postage, Mar. 2, 2000, http://cyberatlas.internet.com/markets/smallbiz/article/0,1323,10098_314571,00.html, website printout dated Apr. 24, 2003 (3 pages).
Stamps.com Launches New Enhanced Version of Internet Postage, Jul. 18, 2000, http://investor.stamps.com/news/20000718-17949.cfm, website printout dated Apr. 24, 2003 (3 pages).
USPS—Print Shipping Label—Frequently Asked Questions, https://sss-web.usps.com/ds/jsps/showFaq.jsp, website printout dated Apr. 24, 2003 (5 pages).
Postage Meters and PC Postage Systems, 024 Quick Service Guide, Jun. 2003 (2 pages).
Global Express Guaranteed, sample Web Air Waybill/Shipping Invoice (1 page).
PC Postage™ Products Refund Request for Unused Postage, PS Form 3533-PCP-X (1 page).
Dreifus et al.—"Smart Cards: A Guide to Building and Managing Smart Card Applications," Chapter 4, John Wiley & Sons, 1998 (3 pages).
Clark—"IT Manager's Guide to Virtual Private Networks," Chapter 3, The McGraw-Hill Companies, Inc., 1999 (3 pages).
Bott et al.—"Special Edition Using Microsoft Office 2000," Chapter 4, Que Corporation, 1999, (1 page).
Muller—"Desktop Encyclopedia of Voice and Data Networking," Section U, The McGraw-Hill Companies, Inc., 2000 (6 pages).
Hendry—"Smart Card Security and Applications," Chapter 8, Artech House, Inc., 1997 (2 pages).
Johnson et al.—"Upgrading and Repairing Your PC Answers! Certified Tech Support," Chapter 5, The McGraw-Hill Companies, 1998 (1 page).

\* cited by examiner

PC POSTAGE™ SERVICE INDICIA DESIGN FOR SHIPPING LABEL

RELATED APPLICATIONS

This is a division of application ser. No. 10/628,411, filed Jul. 29, 2003 now U.S. Pat. No. 8,108,322 and claims the benefit of Provisional Application No. 60/399,251, filed Jul. 29, 2002, the contents of which are herby incorporated by reference. This application is related to an application entitled "SYSTEMS AND METHODS FOR MID-STREAM POSTAGE ADJUSTMENT,"Application Ser. No. 10/630,589, filed Jul. 29, 2003, the contents of which are incorporated herein by reference.

This application claims the benefit under 35 U.S.C. §119 (e) of Provisional Application No. 60/399,251, filed Jul. 29, 2002, the contents of which are hereby incorporated by reference. This application is related to an application entitled "SYSTEMS AND METHODS FOR MID-STREAM POSTAGE ADJUSTMENT," bearing attorney docket number 08049.0923, filed on the same date as the present application, the contents of which are incorporated herein by reference.

TECHNICAL FIELD

The present invention relates to a method of preventing fraud, misuse, abuse and reuse of postage by utilizing a uniquely designed postage indicia for a shipping label.

BACKGROUND

The United States Postal Service ("USPS"), unlike private shipping companies, is required by law to receive payment for postage in advance of mailing of the piece of mail. For this reason, the USPS must closely monitor the payment of postage and the corresponding use of the postage labels, such as stamps. In the past, the postage must be accurately computed prior to producing a postage label or stamp, and affixing it the mailpiece. Often, this meant purchasing the postage label at a U.S. Post Office, or maintaining a strictly monitored postage meter, capable of dispensing the appropriate postage.

With the development of Internet technology, the U.S. Postal Service (USPS) has introduced many new products for the convenience of postal customers. One such product is known as PC Postage™ whereby one can purchase postage over the internet using a computer. One can also use it for most of one's mailing needs: First-Class Mail service, Express Mail® service, Priority Mail service, parcels, International Mail, and payment for special services like Delivery Confirmation™ etc. In this process the postal customer goes online to the USPS web page and makes an online shipping label transaction. The customer enters the type of mailing, recipient's address, sender's address and the requisite payment, which is conducted as a credit card transaction or may be a charge against the customer's deposit account with the USPS. A label is printed with this information and affixed to the mailing.

However, when using these or other methodologies, if the postage amount was improperly computed prior to purchase, the USPS must return the mail to the sender for improper postage. In addition, unless the postage was paid for at a US Post Office, and affixed by a USPS employee, the risk arose that a postage label may be duplicated and used more than once, providing shippers with unauthorized use of the mail system.

Therefore it is an object of this invention to provide a unique label and postage indicia design to prevent this type of fraud. It is also an object of this invention to keep track of all mailing transactions and to reconcile the accounts and collect statistical data on the mailings.

SUMMARY OF THE INVENTION

In accordance with the invention, systems and methods of insuring payment of a proper amount of postage, comprise receiving payment for an amount of postage, affixing a postage indicia to a piece of mail, wherein the postage indicia includes the postage amount in a format readable only by machine, and adjusting the postage amount at a time subsequent to receipt of payment.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
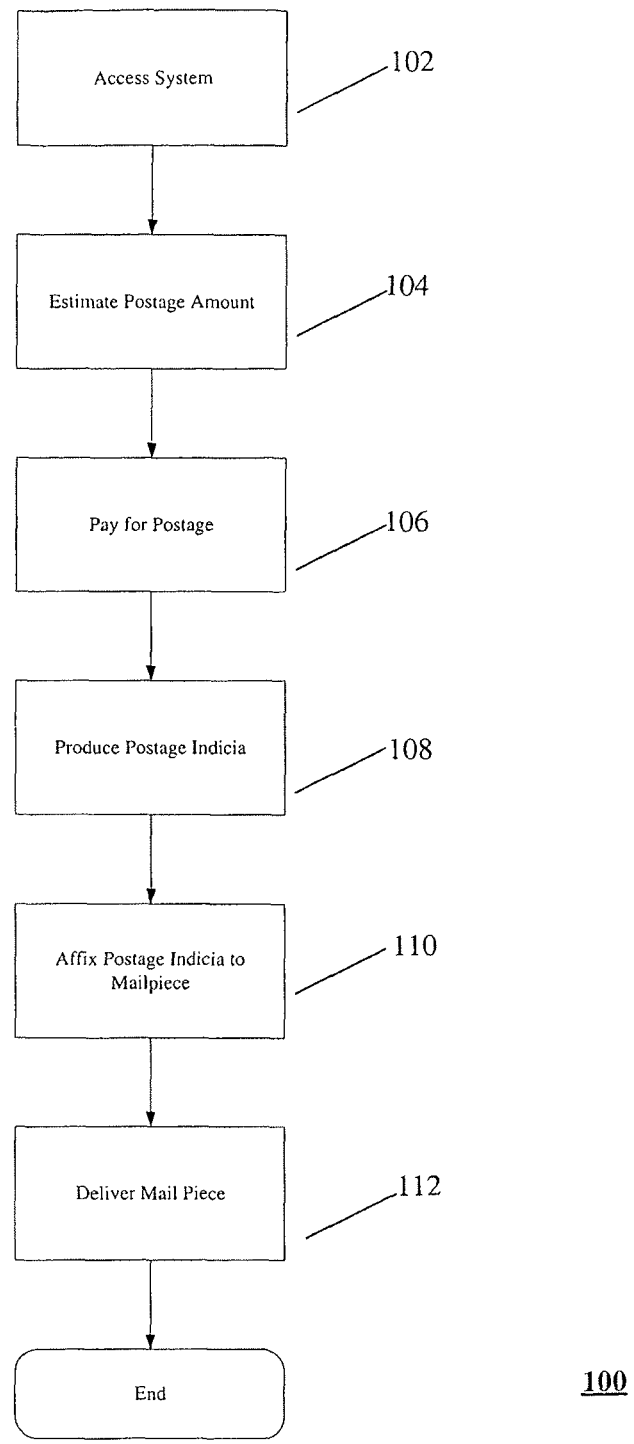
FIG. 1 is a flowchart describing the process used by a sender to obtain postage, in accordance with the present invention.

FIG. 1 is a flowchart showing method 100 performed by a sender (user) to pay a shipper for and receive postage for a mailpiece. While it is preferable that the mailing company (shipper system) is the USPS, this method may similarly be utilized to pay for the transport of a package by any public or private mail or shipping company.

While method 100 may be carried out by an individual at a sending company's facility, such sender would likely have knowledgeable staff and equipment that would accurately determine the postage amount and prevent postage fraud, rendering the present system less necessary. It is therefore preferable that method 100 be implemented on an electrical device, such as a personal computer, capable of performing the described steps. The instructions for carrying out method 100 may be implemented as a software package installed on a personal computer capable of connecting to and transmitting information to, or receiving information from, the USPS. Alternatively, one or more steps of method 100 may be implemented by hardware, such as by a processor containing instructions for carrying out the method.

Alternatively, method 100 may be implemented as a website. For example, the USPS has developed a transactional web site that allows customers to print shipping labels online for domestic Express Mail (EM) and Priority Mail (PM), and Global Express Guaranteed (GXG) and Global Express Mail (GEM). For ease of discussion, the present description discussion will describe method 100 implemented using a website.

Method 100 begins when a person desiring to send a piece of mail ("sender") accesses the shipper's web site (block 102) (i.e. the USPS web site). In block 104, the postage amount necessary for delivery of the package or mailpiece is then estimated. In one implementation, the website will contain a form for the purpose of receiving sufficient information about the mailpiece for the system to calculate the postage. For example, the web page may contain "radio buttons" or input fields for the sender to input the weight, shipping class, destination information, sender information, or other information necessary for an initial determination of the postage amount. It is important to recognize that the information inputted by the sender, and the estimated amount of postage not be 100% accurate, for reasons described below. Instead, the sender may make his or her best guess as to the weight of the parcel (or other information). For the same reason, no specialized hardware is necessary at the sender's location, since accuracy at this point in the process is not a necessity. In another embodiment, the webpage may simply present a list of possible postal rates and allow the sender to select the most appropriate (though not necessarily correct) postal rate.

Once the amount has been estimated, the sender then pays the estimated amount to the shipper (block 106). The sender may accomplish payment of the postage by credit card payment or application of funds from a deposit account with the shipper.

U.S. laws and regulations require mail handled by the USPS to provide evidence of prepaid postage on each package. Therefore, once the sender has accomplished payment of the postage, the system then produces a postage indicia (block 108), which the sender may affix to the mailpiece.

In one embodiment, the software or website will produce the postage indicia by producing a machine-readable representation of information associated with the mailpiece ("postage information"). For example, the software will combine the postage paid, the rate category, a device identification (identifying the device that printed the postage indicia), the licensing code, the sending zip code (or address), the destination zip code (or address), the software identification, the ascending and descending registers, the digital signature algorithm, the date of mailing, and the delivery confirmation code (a unique number assigned to the mailpiece for identification purposes). One of ordinary skill in the art will recognize that one or more pieces of information may be excluded in some circumstances (for example, the ascending and descending registers may be unnecessary in a case where the sender is not using a prepaid postage meter to print the postage indicia). In addition, a unique postage number may be assigned and included as an identification of the postage, for use in preventing duplication of the postage. This information may then be digitally signed using any now known or later developed digital signature algorithm, and the signature may be included as part of the postage information.

For example, a Shipping Shares Services (SSS) Application software application, sends label with postage indicia information to a browser for printing. The label includes a unique delivery confirmation number embedded within a barcode, the sender and recipient's address information, the class of mail, the special service, and the postage indicia. The postage indicia contains the mailing date, the postage amount or indication of postage payment, the ZIP Code™ mailed from, an identifying licensing number, and the corresponding delivery confirmation number at the top of the indicia.

Once the postage indicia has been produced, it may be printed on the mailpiece (or on a label for affixing to the mailpiece). While the label may be printed using specialized equipment such as a prepaid postage meter, or a secure printer with means for preventing duplication (such as a printer that uses proprietary ink to prevent unauthorized duplication), it may also be printed using any unsecured printer or other printing device associated with the sender's (or shipper's) computer. However, as further discussed below, when printing on an unsecured printer, the unique postage number assigned to the postage indicia becomes necessary to prevent unauthorized duplication of the postage indicia.

Figure 2:
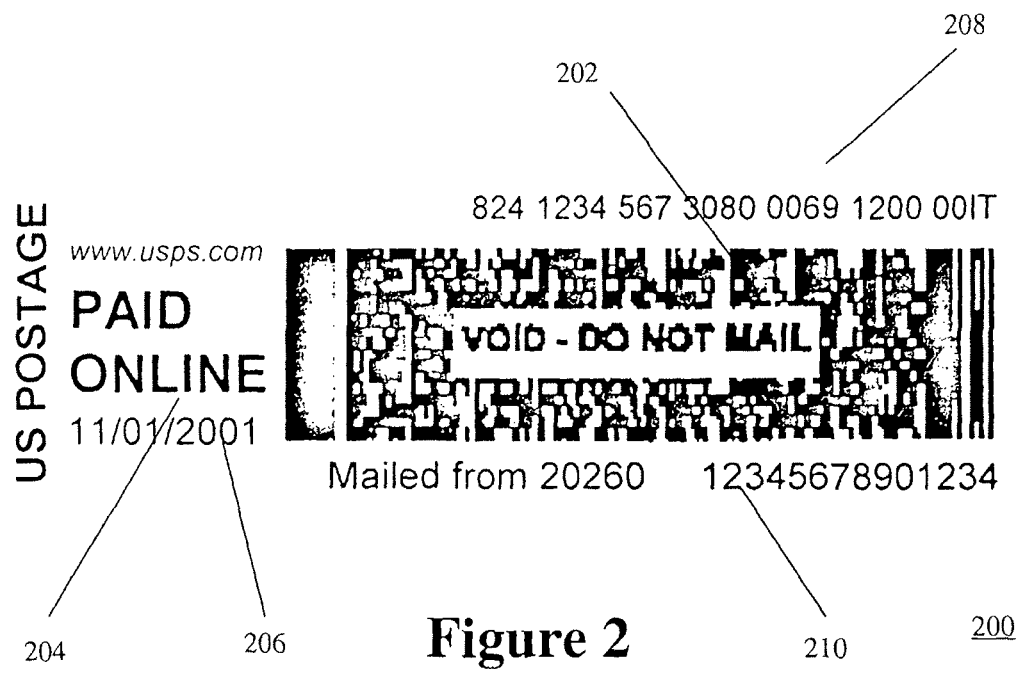
FIG. 2 shows a stealth postage indicia.
Figure 3:
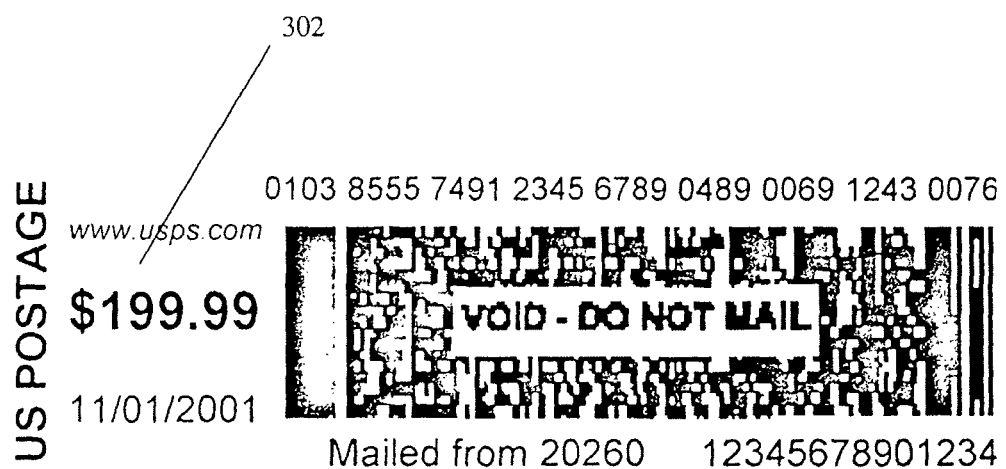
FIG. 3 shows a postage indicia design with postage shown.

In one embodiment, shown in FIG. 2, the printed postage indicia will take the form of a "stealth postage" indicia 200, that is, the postage indicia will include the postage information represented only in machine readable format such as a two dimensional bar code 202 (the bar code may alternatively be implemented as a one-dimensional bar code—not shown). In this embodiment, the postage amount will not be printed on the postage indicia in a human readable form, but may instead include a notation 204 that the postage has been paid. In addition, information contained in the stealth indicia 200 may include the date of mailing 206, a unique delivery confirmation number 208 (to identify the mailpiece), and a unique postage number 210 (to prevent the postage indicia from being separated from the mailpiece), and possibly other identifying information. FIG. 3 shows an alternative version of the postage indicia 300, in which the postage amount 302 is printed on the indicia in a human readable format.

Figure 4:
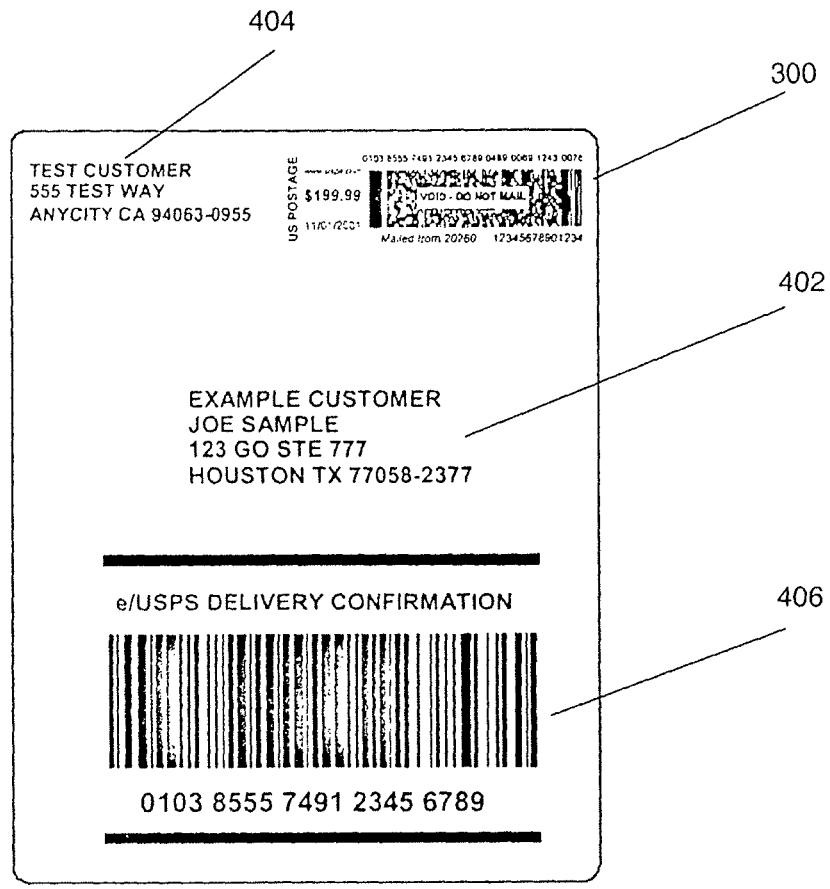
FIG. 4 shows a complete mailing label, including postage indicia design using uncoded postage.

Referring now to FIG. 4, the postage indicia may alternatively be printed as part of mailing label 400 including postage indicia 300 (or stealth indicia, not shown), a destination address 402, a return address 404, and another representation of the unique article number 406 (shown in both human readable and machine readable, i.e. barcode, forms).

Figure 5:
FIG. 5 shows an alternative form of the mailing label including coded postage.
Figure 6:
FIG. 6 shows a another alternative form of the mailing label including coded postage.

FIGS. 5 and 6 show alternative mailing labels for use with the present invention. The mailing label may also include other proprietary information required for proper processing by a shipper system. For example, a label printed for use by the USPS may include a FIM code (not shown, used for orientation of the mailpiece by USPS equipment) and a POSTNET code (502, FIG. 5).

Returning to FIG. 1, once the postage indicia has been produced, the sender affixes it to the mailpiece (block 110) and mails the mailpiece (block 112), such as by delivery to a US Post Office or other facility of the shipper.

Figure 7:
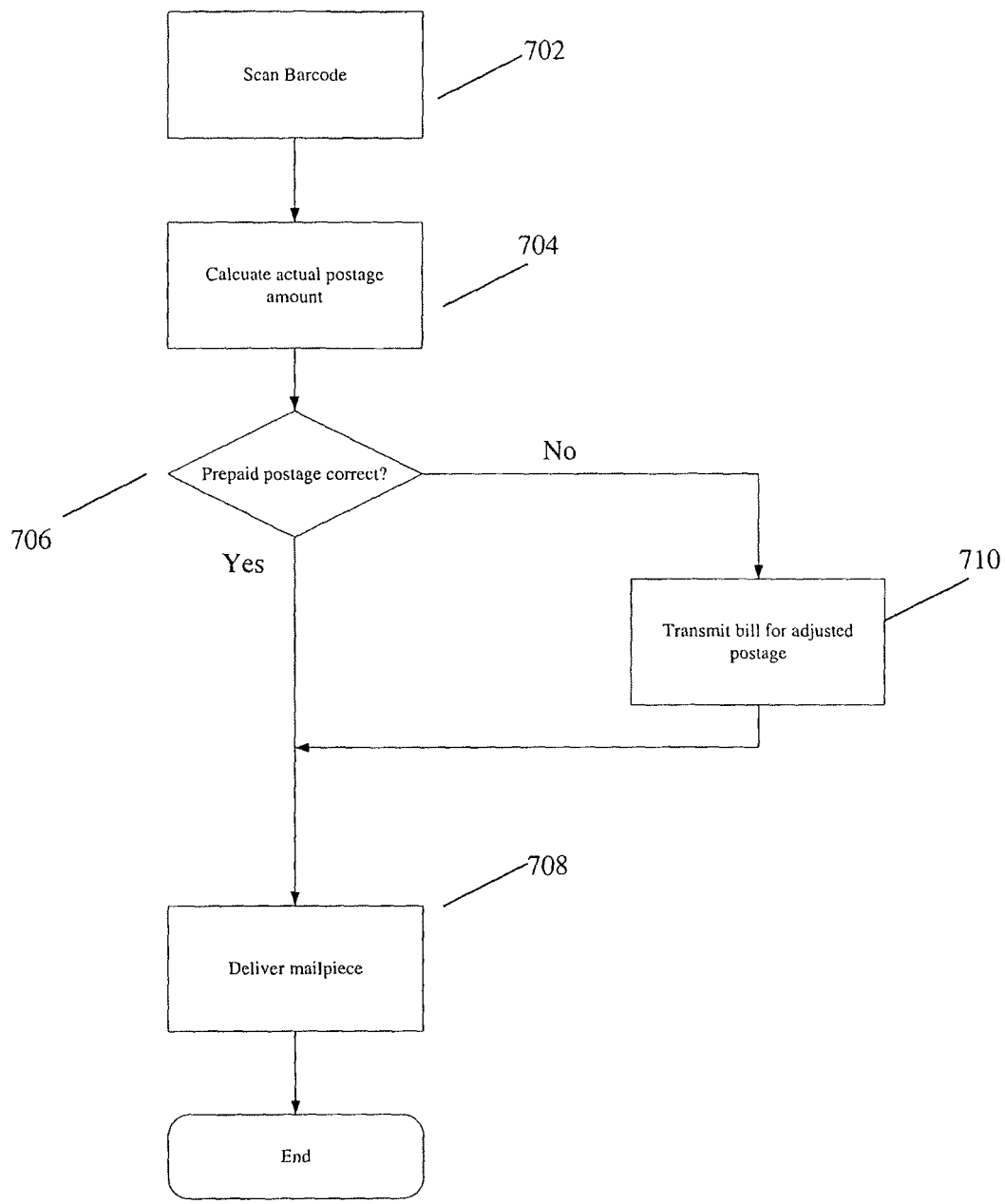
FIG. 7 is a flowchart showing the process used by a shipper system to verify the postage paid on a postage label.
Figure 8:
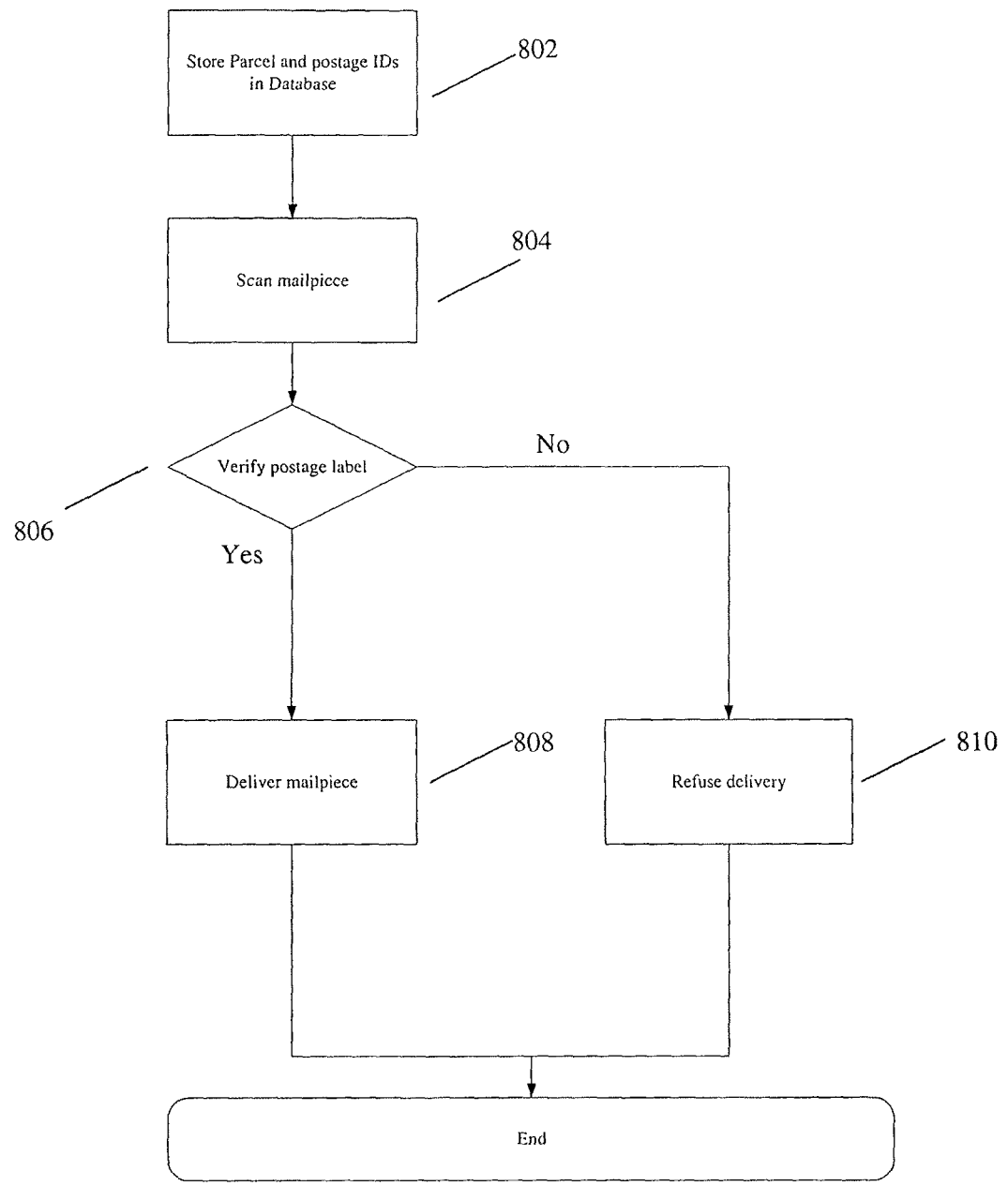
FIG. 8 is a flowchart showing the process used by a shipper system to verify the postage indicia on a piece of mail.

Upon delivery of the mailpiece into the mail stream, the mailing system may also employ process 700, FIG. 7 to verify that the correct amount of postage has been paid, and/or process 800, FIG. 8, to verify that the postage indicia has not been improperly duplicated. These processes may be performed in addition to its standard operating procedures for routing, administering, and delivering mailpieces.

Referring to FIG. 7, process 700 is performed by the shipper to insure that the proper amount of postage has been paid.

Because of the regulations governing the USPS requiring prepayment of postage, it is preferable that process 700 be performed prior to routing and delivery of the mailpiece. However, for private shipping companies the process may alternatively be carried out at any time. Process 700 begins by scanning the mailing label to read the postage amount previously paid by the sender (block 702). The shipping company then calculates the actual amount of postage due for delivery of the mailpiece (block 704). The shipper may calculate this using any known means, including weighing the package, determining the rate category and zone, and consulting the shipper's rate schedule. The shipper then compares the amount paid with the actual amount to verify (decision 706) that the appropriate amount has been paid. If so, the shipper processes the mail according to its standard procedures (block 708). If not, the shipper proceeds to bill (or refund) the sender for the difference (the adjusted postage value) (block 710).

In one embodiment, the billing (or refunding) of the adjusted postage value may be charged to a credit card (such as the one used to pay the initial postage amount) or deducted from a deposit account. To account for the adjusted amount and appropriately track who to bill, the shipper system may maintain a database which it updates with each new purchase of postage by storing the billing information together with the unique delivery confirmation number and/or the unique postage number. In this way, the unique identification of the mailpiece is permanently associated with the sender's billing information. Alternatively, the billing information may be encrypted and embedded in the two-dimensional bar code on the postage indicia together with the parcel information. Once the sender has been appropriately billed, the parcel may then be delivered (block 708), in compliance with regulations governing the USPS.

FIG. 8 is a flowchart describing the process performed by the shipper system to prevent postage fraud. The process begins at the point of purchase of the postage online. As the sender purchases the postage, the shipper updates a postage database by storing at least the unique postage number and the unique delivery confirmation number (block 802). Once the delivery confirmation number barcode and postage number are scanned (block 804), the shipper can then verify (decision 806), against its database, that the postage label is being used with the mailpiece for which it was intended. If a match is not determined, then the use of the postage label on the present mailpiece is unauthorized, and the mailpiece is not delivered (block 808). If, however, at decision 806, a match is found, then the postage label is being used for the parcel for which it was produced, and the mail may be delivered (block 810).

In an alternative embodiment, the block 802 may not be performed. Instead, as each new parcel is entered into the mail system, the postage label may be scanned and the information encoded therein may be entered into a new record in the database. Similarly, as each new parcel is scanned the unique parcel number and postage number may be compared against all other parcel numbers and postage numbers already in the database to prevent unauthorized duplication of the postage indicia. One of ordinary skill in the art will recognize that it is preferable to perform this scan and check as late in the delivery process as possible to prevent bypass of the system. For this purpose, the shipper system may employ portable scanners, capable of communication with the shipper system database, to scan the items as they are delivered to their final destination.

By these methods, the inclusion of the unique article number in the indicia design prevents the main portion of the label from being separated from the postage indicia. The unique article number design also prevents a person from reusing, copying or tampering with a label. The indication that postage was paid online (stealth postage) in place of the postage actually paid for the mailpiece allows for adjustments of postage as necessary and provides shippers with the ability to not disclose the postage amount to customers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of adjusting an amount of prepaid postage on a mailpiece, wherein the mailpiece comprises a postage indicia including an indication of an initial postage amount, comprising:

receiving a payment for the initial postage amount;

receiving the mailpiece, wherein the postage indicia includes the initial postage amount, billing information of a sender, a unique postage number in a machine readable format for uniquely identifying the postage indicia, and a unique delivery confirmation number for identifying the mailpiece;

verifying, by a computer, that the initial postage amount is the proper amount;

updating, by the computer, a database to associate the billing information with the unique postage number;

determining, by the computer, the billing information according to the association between the billing information and the unique postage number stored in the database;

using, by the computer, the billing information to bill a party for an adjusted postage amount upon determining that the initial postage amount is not verified; and altering the postage indicia to reflect the adjusted postage amount, once the party has been billed for the adjusted amount, 2. The method of claim 1, wherein the payment for initial postage amount is received via the Internet.

3. The method of claim 1, wherein the postage indicia is coded on a mailing label, and the initial postage amount is represented in a bar code presented on the mailing label.

4. The method of claim 3, wherein the mailing label further includes at least one of a FIM code, a POSTNET code, and another representation of the unique delivery confirmation number.

5. The method of claim 1, wherein the postage indicia further includes a notation that the initial postage amount has been paid.

6. The method of claim 1, further comprising updating the database with a new purchase of postage.

7. The method of claim 1, further comprising encrypting the billing information in the postage indicia.

8. The method of claim 3, further comprising comparing the unique postage number with other postage numbers within the database to detect unauthorized, duplication of the mailing label.

9. A non-transitory computer readable medium including program instructions stored thereon, which, when executed by a computer, cause the computer to perform a method for adjusting an amount of prepaid postage on a mailpiece, the method comprising:

receiving a payment for an initial postage amount;

receiving a mailpiece including a postage indicia, wherein the postage indicia includes the initial postage amount, billing information of a sender, and a unique postage number in a machine readable format for uniquely identifying the postage indicia, and a unique delivery confirmation number for identifying the mailpiece;

verifying that the initial postage amount is the proper amount;

updating a database to associate the billing information with the unique postage number;

determining, by the computer, the billing information according to the association between the billing information and the unique postage number stored in the database;

billing a party for an adjusted postage amount, if the initial postage amount is determined to be improper; and altering the postage indicia to reflect the adjusted postage amount, once the party has been billed for the adjusted amount.

10. The non-transitory computer readable medium of claim 9, wherein the payment for initial postage amount is received via the Internet.

* * * * *

UNITED STATES PATENT AND TRADEMARK OFFICE
CERTIFICATE OF CORRECTION

| | | |
|---|---|---|
| PATENT NO. | : 8,600,909 B2 | Page 1 of 1 |
| APPLICATION NO. | : 13/334931 | |
| DATED | : December 3, 2013 | |
| INVENTOR(S) | : Gullo et al. | |

It is certified that error appears in the above-identified patent and that said Letters Patent is hereby corrected as shown below:

In the Claims

Claim 1, column 6, line 38, "amount," should read --amount.--.

Claim 8, column 6, line 57, "unauthorized, duplication" should read --unauthorized duplication--.

Signed and Sealed this
Thirteenth Day of May, 2014

Michelle K. Lee
*Deputy Director of the United States Patent and Trademark Office*